Patented Oct. 23, 1928.

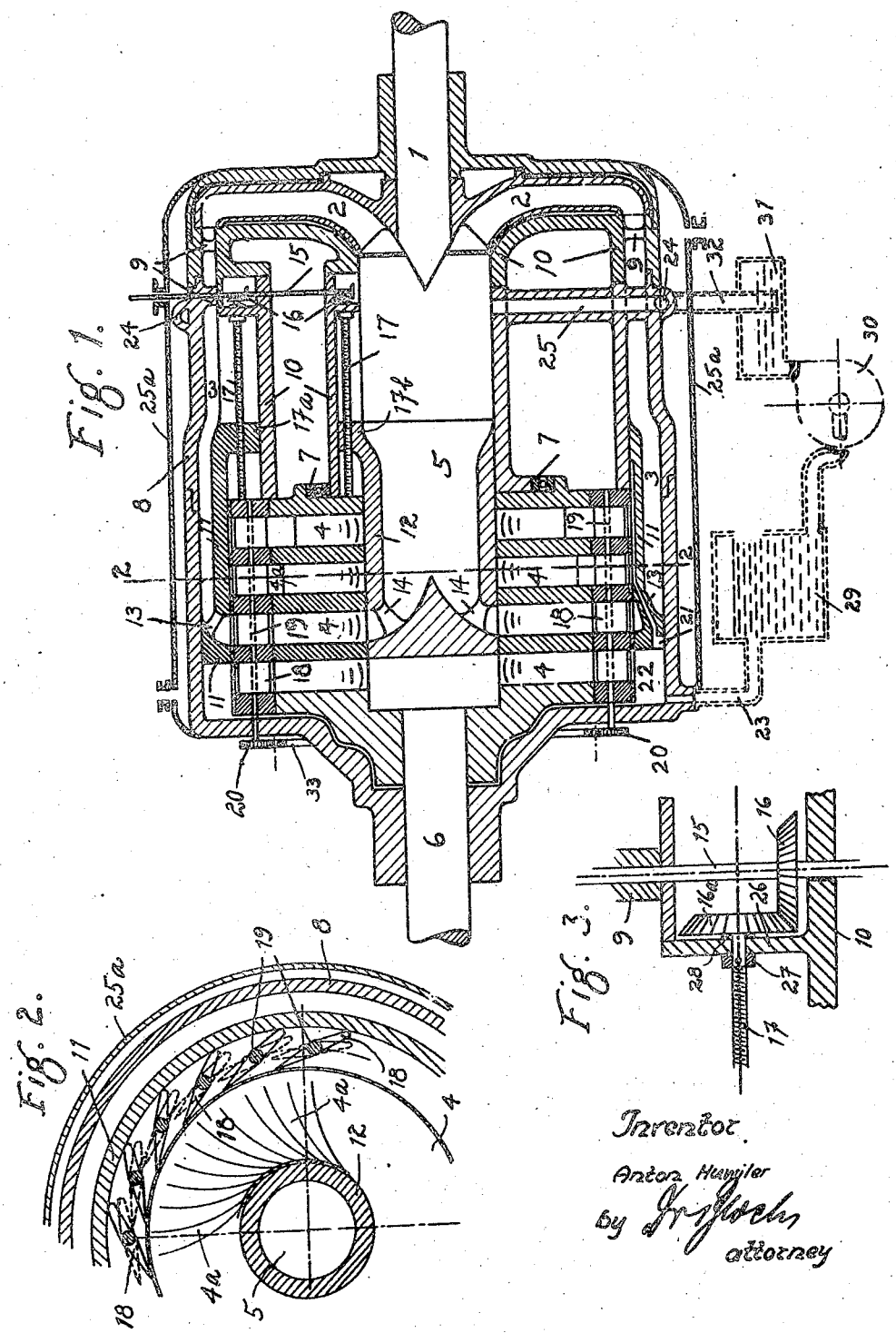

1,688,968

UNITED STATES PATENT OFFICE.

ANTON HUWILER, OF BASEL, SWITZERLAND.

HYDRAULIC POWER-TRANSMISSION GEAR.

Application filed October 27, 1927, Serial No. 229,094, and in Switzerland October 25, 1926.

This invention relates to a hydraulic power-transmission gear more particularly suitable for vehicles, such as locomotives or the like, the motive power of which is derived from Diesel engines. Power-transmission gears of this type have been proposed, in which the work done by the engine (Diesel engine) is converted into hydraulic energy which in turn is converted into mechanical energy in a radial turbine.

It has also been proposed to work at comparatively high efficiency at all ratios of transmission by fitting the turbine shaft with a number of rotors revolving at dissimilar specific speeds, and, if necessary, with a rotor for reversing purposes. In known constructions of this type of gear the liquid-pump is movable relatively to the turbine wheels. This arrangement, however, is not suitable for heavy duties and for the speeds at which Diesel engines are run, because centrifugal force is too great and the machine becomes too unwieldy.

According to this invention, the pump is stationary and has conduits leading to all the turbine wheels. Rotors which are not in operation are closed off from the working liquid by means of adjustable slide members. A set of regulating blades is disposed in front of all the turbine rotors for the purpose of obtaining as high an efficiency as possible, even on fractional loads, in a manner similar to that adopted in ordinary turbine practice.

A constructional example of the gear according to this invention is illustrated in the accompanying drawing, in which:

Figure 1 is a longitudinal section of a hydraulic power-transmission gear according to the invention.

Fig. 2 is a partial section through Fig. 1 according to line 2—2, and

Fig. 3 is a detail of Fig. 1 on a larger scale.

The rotor 2 of a centrifugal pump is keyed on the engine-shaft 1 of the gear. The working fluid flows from the rotor over the whole circumference of an annular chamber 3 and into one of the turbine rotors 4. In this example there are three rotors for forward drive and one for reverse. The blades 4ª of the rotors are of any well known construction and arrangement for instance as indicated in Fig. 2, however, the construction and dimensions of each rotor are dissimilar from those of the other rotors, so that the specific speed of each rotor is different from that of the others. After flowing through one of the rotors 4, the liquid is returned through a chamber 5 to the rotor of the centrifugal pump. The turbine rotors are keyed on a shaft 6 connected to the wheels of the locomotive through the medium of rods, gear-wheels or an angle drive. These rotors are also guided in a bearing 7. The various elements of the turbine are enclosed in a casing 8 made in a number of sections and surrounded, if necessary, with a jacket 25ª for cooling the working liquid. An inner cylinder 10 is carried in the casing 8 by stays 9 and separates the intake conduit from the delivery conduit; it likewise acts as a guide to the outer and inner slide members 11 and 12 respectively. Each member is in two sections rigidly connected to one another by connecting elements 13 and 14. These slide members are moved with the aid of a spindle 15 (Figs. 1 and 3) journalled in the casing 8 and cylinder 10 and supporting two bevel gears 16 engaging corresponding bevel gears 16ª on rods 17. These rods are threaded and engage lips or eyes 17ª and 17ᵇ of the members 11 and 12 respectively, being correspondingly threaded on their inner engaging faces so that by turning the spindle 15 both rods 17 are rotated and as they are held in their axial direction by means of the lip 26 of the cylinder 10 and the two rings or sleeves 27 and 28 (Fig. 3) fastened on the rod 17, the members 11 and 12 are axially moved in such a manner that only one rotor is fully uncovered while the others are fully covered. A set of guide blades 18 is provided for each turbine rotor. The blades are adjustable and one blade of each set of blades is rotated in common by shafts 19 and gear-wheels 20 fastened on the shafts 19, the gear wheels 20 meshing with a gear wheel 33 so that by turning this wheel 33 all gear wheels 20 and shafts 19 are commonly rotated. Each set of guide blades 18 is disposed between the outer slide member 11 and the turbine rotors 4. The outer slide members 11 have a conduit 21 to permit the liquid to run out of the turbine rotors which are not in use, and which are emptied, on the side of the centrifugal pump, into a chamber 22 disposed behind the slide member. All turbine rotors behind the slide member are emptied through the said conduit directly into this chamber, from which the liquid flows through a pipe 23 into a reservoir 29 from which the said liquid is transferred by a pump 30 to another reservoir 31 filled with compressed air. Any turbine rotor which has just been uncovered by the slide member is immediately filled with liquid which must be promptly replaced to avoid faulty working. To this end, the pressure reservoir 31 is connected to the chamber 5 (suction conduit) through a pipe 32 opening into an annular conduit 24 and a number of radially disposed ducts 25 so that the pressure-loaded liquid in the said reservoir rapidly flows out for liquid-replacement purposes. The parts 23, 29, 30, 31 and 32 are shown in the drawing in dotted lines in order to indicate that these parts may be arranged in any convenient manner and preferably remote from the power-transmission gear.

It is quite clear that the driving and driven shafts may if necessary be disposed angularly.

The construction of the gear may of course differ from that shown in the drawing. For example, a larger or smaller number of turbine rotors may be provided.

Having now particularly described and ascertained the nature of my said invention and in what manner the same is to be performed, I declare that what I claim is:

1. A hyraulic power-transmission gear, comprising in combination, a centrifugal pump, a plurality of turbine rotors having dissimilar specific speeds, a common shaft for said rotors, conduits connecting said pump and rotors, axially movable slide members adapted to throw each of the rotors in and out of the circuit of the liquid and conduits through which the rotors not in operation communicate with the suction chamber of the pump into which the said rotors may be drained.

2. A hydraulic power-transmission gear, comprising in combination, a centrifugal pump, a plurality of turbine rotors having dissimilar specific speeds, a common shaft for said rotors, conduits connecting said pump and rotors, axially movable slide members adapted to throw each of the rotors in and out of the circuit of the liquid and a set of adjustable regulating blades disposed in front of all the turbine rotors for regulating purposes on fractional load.

3. A hydraulic power-transmission gear, comprising in combination, a centrifugal pump, a plurality of turbine rotors having dissimilar specific speeds, a common shaft for said rotors, conduits connecting said pump and rotors, axially movable slide members adapted to throw each of the rotors in and out of the circuit of the liquid and a set of adjustable rotatable regulating blades disposed in front of all the turbine rotors for regulating purposes on fractional load and common means simultaneously setting all of the blades.

In testimony whereof I have affixed my signature.

ANTON HUWILER.